United States Patent
Saito et al.

(10) Patent No.: US 9,752,091 B2
(45) Date of Patent: Sep. 5, 2017

(54) LUBRICANT BASE OIL, REFRIGERATOR OIL AND WORKING FLUID COMPOSITION FOR REFRIGERATORS

(71) Applicant: JX NIPPON OIL & ENERGY CORPORATION, Tokyo (JP)

(72) Inventors: Masanori Saito, Tokyo (JP); Ken Sawada, Tokyo (JP); Takeshi Okido, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/416,795

(22) PCT Filed: Jul. 25, 2013

(86) PCT No.: PCT/JP2013/070213
§ 371 (c)(1),
(2) Date: Jan. 23, 2015

(87) PCT Pub. No.: WO2014/017596
PCT Pub. Date: Jan. 30, 2014

(65) Prior Publication Data
US 2015/0184103 A1     Jul. 2, 2015

(30) Foreign Application Priority Data

Jul. 26, 2012 (JP) ................. 2012-165726

(51) Int. Cl.
*C09K 5/04* (2006.01)
*C10M 105/46* (2006.01)
*C10M 171/00* (2006.01)

(52) U.S. Cl.
CPC .......... *C10M 105/46* (2013.01); *C09K 5/041* (2013.01); *C09K 5/042* (2013.01); *C09K 5/045* (2013.01); *C10M 171/008* (2013.01); *C09K 2205/102* (2013.01); *C09K 2205/104* (2013.01); *C09K 2205/106* (2013.01); *C09K 2205/12* (2013.01); *C09K 2205/126* (2013.01); *C09K 2205/22* (2013.01); *C09K 2205/24* (2013.01); *C10M 2205/0285* (2013.01); *C10M 2207/2825* (2013.01); *C10M 2207/2835* (2013.01); *C10M 2207/301* (2013.01); *C10M 2207/3025* (2013.01); *C10M 2207/3045* (2013.01); *C10M 2223/041* (2013.01); *C10N 2220/022* (2013.01); *C10N 2220/023* (2013.01); *C10N 2220/028* (2013.01); *C10N 2220/302* (2013.01); *C10N 2220/303* (2013.01); *C10N 2220/306* (2013.01); *C10N 2230/06* (2013.01); *C10N 2230/10* (2013.01); *C10N 2230/70* (2013.01); *C10N 2240/30* (2013.01)

(58) Field of Classification Search
CPC ...... C10M 171/008; C10M 2207/2835; C10M 105/42; C10M 105/44; C10M 105/46
See application file for complete search history.

(56) References Cited

U.S. PATENT DOCUMENTS

| | | | |
|---|---|---|---|
| 2,751,351 A | 6/1956 | Young et al. | |
| 5,798,319 A * | 8/1998 | Schlosberg | C07C 69/44 507/100 |
| 2003/0087768 A1 | 5/2003 | Florchinger et al. | |

FOREIGN PATENT DOCUMENTS

| CN | 101017035 | 8/2007 |
|---|---|---|
| EP | 0 445 610 | 2/1991 |
| EP | 2 930 228 A1 | 10/2015 |
| GB | 844778 | 8/1960 |
| JP | H03-128991 | 5/1991 |
| JP | H06-009978 | 1/1994 |
| JP | H06-501972 | 3/1994 |
| JP | 2002-220595 | 8/2002 |
| JP | 2007-232353 | 9/2007 |
| JP | 2009-221375 | 10/2009 |
| JP | 2011-184536 | * 9/2011 |

OTHER PUBLICATIONS

Li et al., "The Development of New Type Environmental Protective Refrigerator Oil", *Research Institute of PetroChina Karamay Blending Plant*, pp. 5-9, 2006; with an English Abstract.
Office Action issued in China Counterpart Patent Appl. No. 201380039783.8, dated Dec. 24, 2015.
European Search Report for Application No. EP 13 82 3000.8, mailed on Jun. 5, 2015.
International Search Report of Patent Application No. PCT/JP2013/070213 mailed Oct. 15, 2013; along with an English translation thereof.
International Preliminary Report on Patentability for PCT/JP2013/070213, which was mailed on Feb. 5, 2015.
Office Action issued in European Counterpart Patent Application No. 13823000.8, dated Sep. 6, 2016.

* cited by examiner

*Primary Examiner* — John Hardee
(74) *Attorney, Agent, or Firm* — Greenblum & Bernstein, P.L.C.

(57) ABSTRACT

The lubricating base oil of the present invention comprises an ester synthesized from: a first component that is at least one selected from polyhydric alcohols having 2 to 4 hydroxyl groups; a second component that is at least one selected from polybasic acids having 6 to 12 carbon atoms; and a third component that is at least one selected from monohydric alcohols having 4 to 18 carbon atoms and monocarboxylic acids having 2 to 12 carbon atoms. In addition, the refrigerating machine oil and the working fluid composition for a refrigerating machine of the present invention each comprise the above lubricating base oil.

9 Claims, No Drawings

LUBRICANT BASE OIL, REFRIGERATOR OIL AND WORKING FLUID COMPOSITION FOR REFRIGERATORS

TECHNICAL FIELD

The present invention relates to a lubricating base oil, a refrigerating machine oil and a working fluid composition for a refrigerating machine.

BACKGROUND ART

In the refrigeration/air-conditioning field, 1,1,1,2-tetrafluoroethane (R134a), R410A as a mixed refrigerant of difluoromethane (R32) and pentafluoroethane (R125) in a mass ratio of 1/1, and the like, which are hydrofluorocarbons (HFC), are currently widely used as refrigerants for coolerators, car air-conditioners, room air-conditioners, industrial refrigerators, and the like.

These HFC refrigerants, however, have a high global warming potential (GWP) of 1000 or more while having an ozone depletion potential (ODP) of zero, and thus the use thereof comes to be limited by the so-called F-gas regulation for the purpose of global environment protection.

As alternatives of the refrigerant high in GWP, 2,3,3,3-tetrafluoropropene (HFO-1234yf) and difluoromethane (R32) itself have been studied as candidates in terms of their thermodynamic characteristics. In addition, a mixed refrigerant of such a refrigerant and other refrigerant, which is well-balanced with respect to GWP and various characteristics, has also been studied. An alternative of the HFC refrigerant is required to be low in GWP, and the GWP of HFO-1234yf is as low as 4. Although the GWP of R32 is as slightly high as 675, R32 has been studied as a major candidate because the gas pressure thereof is high and R32 is a highly-effective refrigerant (for example, Patent Literature 1).

In addition, hydrocarbon refrigerants such as isobutane (R600a) and propane (R290), which have been already in practical use for coolerators, have been studied as alternative refrigerants while they are flammable, because the GWP is as low as 20 or less and physical property values are suitable.

When a refrigerant whose pressure is high, such as R32 or a mixed refrigerant including R32, among alternative refrigerant candidates, is used, the discharge temperature in a compressor is higher, thus the oil film of a refrigerating machine oil for lubricating the inside of the compressor is thinner and lubricating conditions are severer, and therefore a refrigerating machine oil good in lubricity and stability is required.

In addition, in the case of the hydrocarbon refrigerant, not only fluorine that results in an increase in lubricity is not present in the hydrocarbon molecule and thus the refrigerant cannot be expected to exert the lubricity enhancement effect unlike the HFC refrigerant and the like, but also the solubility of the hydrocarbon refrigerant in the refrigerating machine oil is high to reduce the viscosity of the oil, thereby making lubricating conditions severer, and it is demanded for the refrigerating machine oil that its antiwear property is equal to or higher than that of a conventional one.

CITATION LIST

Patent Literature

[Patent Literature 1] Japanese Patent Application Laid-Open No. 2009-221375

SUMMARY OF INVENTION

Technical Problem

The present invention is aimed at providing a lubricating base oil that is large in the effect of antiwear and also good in stability and excellent in long-term reliability even under severe lubricating conditions as compared with a conventional lubricating base oil, as well as a refrigerating machine oil and a working fluid composition for a refrigerating machine, using the lubricating base oil.

Solution to Problem

The present inventors have found that a lubricating base oil containing a complex ester synthesized from specific polyhydric alcohol, polybasic acid, dihydric alcohol and monohydric alcohol is high in antiwear property and good in stability, and can be stably used over a long period, thereby leading to the completion of the present invention.

That is, the present invention provides lubricating base oils according to the following [1] to [7], refrigerating machine oils according to the following [8] to [14], and a working fluid composition for a refrigerating machine according to the following [15].
[1] A lubricating base oil comprising an ester synthesized from: a first component that is at least one selected from polyhydric alcohols having 2 to 4 hydroxyl groups; a second component that is at least one selected from polybasic acids having 6 to 12 carbon atoms; and a third component that is at least one selected from monohydric alcohols having 4 to 18 carbon atoms and monocarboxylic acids
[2] The lubricating base oil according to [1], wherein the first component comprises at least one selected from neopentyl glycol, trimethylolpropane and pentaerythritol.
[3] The lubricating base oil according to [1] or [2], wherein the first component comprises a first alcohol that is at least one selected from neopentyl glycol trimethylolpropane and pentaerythritol, and a second alcohol that is at least one selected from dihydric alcohols having 2 to 10 carbon atoms other than neopentyl glycol.
[4] The lubricating base oil according to any one of [1] to [3], wherein the first component comprises at least one selected from neopentyl glycol and trimethylolpropane.
[5] The lubricating base oil according to any one of [1] to [4], wherein the second component comprises at least one selected from adipic acid and sebacic acid.
[6] The lubricating base oil according to any one of [1] to [5], wherein the first component comprises butanediol.
[7] The lubricating base oil according to any one of [1] to [6], wherein the third component comprises at least one selected from monohydric alcohols having 8 to 10 carbon atoms.
[8] A refrigerating machine oil comprising the lubricating base oil according to any one of [1] to [7].
[9] The refrigerating machine oil according to [8], being used with a refrigerant comprising at least one selected from hydrofluorocarbons, hydrofluoroolefins, hydrocarbons having 2 to 4 carbon atoms, and carbon dioxide.
[10] The refrigerating machine oil according to [8] or [9], being used with a refrigerant having a global warming potential of 1000 or less.
[11] The refrigerating machine oil according to any one of [8] to [10], being used with a refrigerant having a global warming potential of 700 or less.

[12] The refrigerating machine oil according to any one of [8] to [11], being used with a refrigerant comprising difluoromethane.

[13] The refrigerating machine oil according to any one of 8 to 12, being used with a refrigerant comprising propane or isobutane.

[14] The refrigerating machine oil according to any one of [8] to [12], being used with a refrigerant comprising at least one hydrofluoropropene.

[15] A working fluid composition for a refrigerating machine, comprising: a refrigerating machine oil comprising the lubricating base oil according to any one of [1] to [7]; and a refrigerant comprising at least one selected from hydrofluorocarbons, hydrofluoroolefins, hydrocarbons having 2 to 4 carbon atoms, and carbon dioxide.

Advantageous Effects of Invention

The lubricating base oil, refrigerating machine oil and working fluid composition for a refrigerating machine of the present invention exert remarkable effects so that they are high in antiwear property and good in stability as well as allow refrigeration/air-conditioning equipment to be stably used over a long period, even under severe lubricating conditions, as compared with conventional lubricating base oil, refrigerating machine oil and working fluid composition for a refrigerating machine.

DESCRIPTION OF EMBODIMENTS

Hereinafter, suitable embodiments of the present invention are described in detail.

[First Embodiment: Lubricating Base Oil]

A lubricating base oil according to a first embodiment of the present invention contains an ester (hereinafter, sometimes also referred to as "complex ester according to the present embodiment") synthesized from a first component, a second component and a third component shown below:

first component: at least one selected from polyhydric alcohols having 2 to 4 hydroxyl groups, second component: at least one selected from polybasic acids having 6 to 12 carbon atoms, and third component: at least one selected from monohydric alcohols having 4 to 18 carbon atoms and monocarboxylic acids having 2 to 12 carbon atoms.

Herein, the terms "first component", "second component" and "third component" are conveniently collective terms, and the compound(s) included in each of the components may be one compound, or two or more compounds.

The first component contains at least one selected from polyhydric alcohols having 2 to 4 hydroxyl groups. Examples of such polyhydric alcohols include neopentyl glycol, trimethylolpropane and pentaerythritol, and also dihydric alcohols having 2 to 10 carbon atoms other than neopentyl glycol.

It is preferable that the first component contain at least one polyhydric alcohol (hereinafter, sometimes also referred to as "(A) component") selected from neopentyl glycol, trimethylolpropane and pentaerythritol. The (A) component can be used as the first component to thereby impart viscosity suitable as a base oil to the resulting ester, as compared with the case where the (A) component is not used. In the case where at least one selected from neopentyl glycol and trimethylolpropane is here used as the (A) component, viscosity can be lowered and more excellent low-temperature characteristics can be achieved as compared with the case where pentaerythritol that is a tetrahydric alcohol is used. Furthermore, in the case where neopentyl glycol is used, viscosity can be widely adjusted, and such a case is more preferable.

In addition, it is preferable that the first component contain the (A) component and dihydric alcohol(s) having 2 to 10 carbon atoms other than neopentyl glycol (hereinafter, sometimes also referred to as "(B) component"). The (B) component can be used to thereby enhance the lubricity of the resulting ester as compared with the case where the (B) component is not used. Examples of the (B) component include ethylene glycol, propanediols, butanediols, pentanediols, hexanediols, 2-methyl-1,3-propanediol, 3-methyl-1,5-pentanediol and 2,2-diethyl-1,3-pentanediol. Butanediols, in which the characteristic balance of the base oil synthesized is good, are preferable, and examples thereof include 1,2-butanediol, 1,3-butanediol, 1,4-butanediol and 2,3-butanediol, but 1,3-butanediol and 1,4-butanediol are more preferable in terms of characteristics.

The second component contains at least one selected from polybasic acids having 6 to 12 carbon atoms (hereinafter, sometimes also referred to as "(C) component"). Such polybasic acids include adipic acid, pimelic acid, suberic acid, azelaic acid, sebacic acid, phthalic acid and trimellitic acid. Adipic acid and sebacic acid, which are well balanced with respect to the lubricity and the stability of the resulting base oil and are available, are preferable, and among them, adipic acid is more preferable.

The third component contains at least one selected from monohydric alcohols having 4 to 18 carbon atoms and monocarboxylic acids having 2 to 12 carbon atoms.

Examples of such monohydric alcohols having 4 to 18 carbon atoms (hereinafter, sometimes also referred to as "(D) component") include butanols, pentanols, heptanols, octanols, nonanols, decanols, dodecanols and oleyl alcohols. These monohydric alcohols may be either linear alcohols or branched alcohols. Monohydric alcohols having 8 to 10 carbon atoms are preferable, and among them, 2-ethylhexanol that is a branched octanol and 3,5,5-trimethylhexanol that is a branched nonanol are preferable in terms of good low-temperature characteristics of the complex ester synthesized.

Specific examples of such monocarboxylic acids having 2 to 12 carbon atoms (hereinafter, sometimes also referred to as "(E) component") include acetic acid, propanoic acids (also referred to as propionic acids), linear or branched butanoic acids, linear or branched pentanoic acids, linear or branched hexanoic acids, linear or branched heptanoic acids, linear or branched octanoic acids, linear or branched nonanoic acids, linear or branched decanoic acids, linear or branched undecanoic acids, and linear or branched dodecanoic acids. As the (E) component, α- and/or β-branched fatty acids are preferable, isobutanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid and the like are preferable, and among them, 2-ethylhexanoic acid and/or 3,5,5-trimethylhexanoic acid is particularly preferable.

Examples of a preferable mode of the complex ester according to the present embodiment include an ester synthesized from (A) a first alcohol that is at least one selected from neopentyl glycol, trimethylolpropane and pentaerythritol, (B) a second alcohol that is at least one selected from dihydric alcohols having 2 to 10 carbon atoms other than neopentyl glycol, (C) at least one polybasic acid selected from polybasic acids having 6 to 12 carbon atoms, and (D) a third alcohol that is at least one selected from monoalcohols having 4 to 18 carbon atoms.

The method for synthesizing the complex ester according to the present embodiment is not particularly limited. Examples of a preferable method for synthesizing the ester from the above components (A) to (D) include the following.

First, the (A) component, the (B) component and the (C) component are reacted to obtain a first ester intermediate. The molar ratio of the (A) component, the (B) component and the (C) component is here adjusted such that the carboxylic acid group (—COOH) derived from the (B) component is present in the resulting first ester intermediate.

Then, the above first ester intermediate and the (D) component are reacted to esterify the carboxylic acid group (—COOH) of the first ester intermediate with the (D) component (monohydric alcohols having 4 to 18 carbon atoms) to obtain the intended ester (the complex ester according to the present embodiment).

The esterification reaction in each of the steps can be performed according to a conventional method, and the reaction condition of the esterification reaction can be appropriately selected.

Herein, in the case of a complex ester including monobasic acid(s) as a constituent component (the molar ratio of the polybasic acid to the polyhydric alcohol is adjusted to allow an ester intermediate in which the hydroxyl group of the alcohol remains, and the hydroxyl group is esterified with a monocarboxylic acid), the ester may cause a relatively strong acid by hydrolysis when used as a refrigerating machine oil, and stability may be insufficient. On the contrary, the ester synthesized from the (A), (B), (C) and (D) components contains no monocarboxylic acid as a constituent component, and thus has a higher stability than a complex ester containing it as a constituent component.

The complex ester according to the present embodiment can be suitably used as a base oil of a refrigerating machine oil that is a lubricant of a refrigeration/air-conditioning refrigerating machine. Herein, as described later, a refrigerating machine oil according to the present embodiment can further contain a base oil other than the complex according to the present embodiment, and various additives.

[Second Embodiment: Refrigerating Machine Oil]

A refrigerating machine oil according to a second embodiment of the present invention contains an ester synthesized from a first alcohol that is at least one selected from neopentyl glycol, trimethylolpropane and pentaerythritol, a polybasic acid that is at least one selected from polybasic acids having 6 to 12 carbon atoms, a second alcohol that is at least one selected from dihydric alcohols having 2 to 10 carbon atoms other than neopentyl glycol, and a third alcohol that is at least one selected from monohydric alcohols having 4 to 18 carbon atoms (hereinafter, sometimes also referred to as "the complex ester according to the present embodiment"). Herein, the complex ester is the same as the complex ester according to the first embodiment, and thus explanation overlapped is here omitted.

The refrigerating machine oil according to the present embodiment may be one made of only the complex ester according to the present embodiment (namely, the content of the complex ester according to the present embodiment is 100% by mass based on the total amount of the refrigerating machine oil), and may further contain a lubricating base oil and/or additive other than the complex ester according to the present embodiment.

In the case where the refrigerating machine oil according to the present embodiment further contains a lubricating base oil and/or additive other than the complex ester according to the present embodiment, the content of the complex ester is preferably 10% by mass or more, more preferably 20% by mass or more and further preferably 30% by mass or more based on the total amount of the refrigerating machine oil.

Examples of the lubricating base oil other than the complex ester according to the present embodiment include a mineral oil type base oil, and a synthetic base oil other than the complex ester according to the present embodiment.

The refrigerating machine oil according to the present embodiment can contain additives such as an antioxidant, a friction modifier, an antiwear additive (including an antiwear agent and extreme pressure agent), an antirust agent, a metal deactivator and an antifoamer in order to further enhance performances, as long as the object of the present invention is not impaired.

For example, the antioxidant includes a phenolic compound such as di-tert-butyl-p-cresol, and an amine type compound such as alkyl diphenylamine, the friction modifier includes aliphatic amines, aliphatic amides, aliphatic imides, alcohols, esters, acidic phosphate amine salt and phosphite amine salt, the anti-wear agent includes zinc dialkyldithiophosphate, the extreme pressure agent includes sulfurized olefins and sulfurized oils and fats, the antirust agent includes alkenyl succinate or partial esters, the metal deactivator includes benzotriazole, and the antifoamer includes a silicone compound and a polyester compound, respectively.

In addition, in order to further enhance antiwear property of the refrigerating machine oil according to the present embodiment, it is possible to apply an antiwear additive. Examples of a preferable antiwear additive include phosphates, and among them, examples of a preferable compound include triphenyl phosphate (TPP), tricresyl phosphate (TCP), and alkylphenylphosphates having an alkyl group having 3 to 4 carbon atoms (APPs). TPP and TCP each have a single structure. On the other hand, APPs are each usually a mixture of APP having one alkylphenyl group (mono-type), APP having two alkylphenyl groups (di-type) and APP having three alkylphenyl groups (tri-type), but the mixing ratio thereof is not particularly limited. In terms of the enhancement effect of antiwear property, and stability, the content of the antiwear additive is preferably 0.1 to 3.0% by mass based on the total amount of the refrigerating machine oil.

In addition, a suitable sulfur type additive is a sulfide compound. There are many types of sulfide compounds, but among them, a monosulfide compound is preferable. Herein, for example, a sulfur compound whose activity is high, such as a disulfide compound, may cause stability of the refrigerating machine oil to be deteriorated and may cause copper often used in the inside of refrigeration equipment to be converted. As the sulfide compound, in particular, a thiobisphenol compound that has antioxidizing, namely, radical scavenging ability and that is a stabilizer is preferable. The antiwear effect thereof is comparable with that of phosphates. The content of the sulfide compound is preferably 0.05 to 2.0% by mass based on the total amount of the refrigerating machine oil. If the content is less than 0.05% by mass, the effect of adding the sulfide compound may be insufficient. In addition, if the content is more than 2.0% by mass, corrosive wear may be conversely caused depending on the atmosphere.

The kinematic viscosity at 40° C. of the refrigerating machine oil according to the present embodiment is preferably 3 to 500 mm²/s, more preferably 3 to 300 mm²/s and further preferably 5 to 150 mm²/s.

The pour point of the refrigerating machine oil according to the present embodiment is preferably −10° C. or lower and more preferably −20° C. or lower. In addition, from the viewpoint of lubricity, the pour point is preferably −55° C. or higher.

The acid value of the refrigerating machine oil according to the present embodiment can be preferably 0.1 mgKOH/g or less and more preferably 0.05 mgKOH/g or less in order to prevent corrosion of a metal used in a refrigerating machine or pipe and suppress degradation of the refrigerating machine oil itself. Herein, the acid value in the present invention means an acid value measured according to "petroleum products and lubricants-neutralization test method" in JIS K2501.

The viscosity index and the flash point of the refrigerating machine oil according to the present embodiment are not particularly limited, but the kinematic viscosity is preferably 10 or more, and the flash point is preferably 120° C. or higher and more preferably 200° C. or higher. In addition, the moisture content of the refrigerating machine oil according to the present embodiment is also not limited, but is preferably 200 ppm or less, more preferably 100 ppm or less and most preferably 50 ppm or less. In particular, in the case where the refrigerating machine oil is used in a closed type refrigerating machine, it is demanded that the moisture content be low from the viewpoints of stability and electrical insulation property of the refrigerating machine oil.

The refrigerating machine oil according to the present embodiment can be used together with various refrigerants. In other words, according to the present embodiment, a working fluid composition for a refrigerating machine, containing the refrigerating machine oil according to the present embodiment and a refrigerant is provided. In particular, the refrigerating machine oil according to the present embodiment can exert an excellent effect in the case of being used together with a refrigerant low in GWP.

The refrigerant is here described in detail: in the case of a refrigerating machine, as described above, a HFC refrigerant currently used, which is high in GWP, tends to be transferred to a refrigerant low in GWP from the viewpoint of global warming prevention, and a refrigerating machine oil to be adapted thereto is demanded.

Currently, 1,1,1,2-tetrafluoroethanes (HFC-134a, R134a) are widely used for coolerators and car air-conditioners, and R410A that is a mixed refrigerant of difluoromethanes (HFC-32, R32) and pentafluoroethanes (HFC-125, R125) in a mass ratio of 1/1 is widely used for room air-conditioners, respectively. It has been considered that, as the base oil of a refrigerating machine oil for a refrigerating machine in which these refrigerants are used, esters (however, not including the complex according to the present embodiment), polyethers, in particular, polyol esters, polyalkylene glycols, and polyvinyl ethers are suitable. The reason for this is because, in the refrigerant circulation cycle of refrigeration/air-conditioning equipment, a refrigerating machine oil for lubricating a compressor circulates together with a refrigerant in the cycle, and thus the refrigerating machine oil is demanded to be compatible with the refrigerant. If the refrigerating machine oil is not compatible with the refrigerant, the refrigerating machine oil discharged from the compressor is easily retained, and as a result, there occur the problems of wear due to lubrication failure by reduction in the amount of the oil in the compressor and blockage of an expansion mechanism such as a capillary.

Each of the above refrigerants, however, whose GWP is as high as 1000 or more, and thus the use thereof is expected to be limited by the so-called F-gas regulation. Then, as an alternative thereof, hydrofluoroolefins (HFOs) and difluoromethane (R32) that are unsaturated hydrofluorocarbons low in GWP, or hydrocarbon refrigerants such as propane (R290) and isobutane (R600a), and a mixed refrigerant including them are studied, and are major candidates.

Examples of the unsaturated hydrofluorocarbons include 2,3,3,3-tetrafluoropropene (HFO-1234yf), 1,3,3,3-tetrafluoropropene (HFO-1234ze) and 1,2,3,3,3-pentafluoropropene (HFO-1225ye). These HFO refrigerants each have an easily degradable olefin structure in the molecule, and thus are characterized by being poor in stability while being low in GWP. In particular, decomposition of the refrigerant together with wearing may be promoted by local heat generation in a sliding portion due to metal/metal contact under severe lubricating conditions, leading to degradation of a working fluid in which the refrigerant is compatible with the refrigerating machine oil, and lubricity of the refrigerating machine oil is an extremely important property.

In addition, in the case of R32 that is hydrofluorocarbon (HFC) low in boiling point and high in pressure, or a mixed refrigerant including R32 in a large amount, the discharge temperature of the compressor is increased and thus the oil film of the refrigerating machine oil is thinner, making lubricating conditions severer. In addition, in the case of a hydrocarbon refrigerant such as propane (R290), fluorine that contributes to an enhancement in lubricity is not present in the hydrocarbon molecule and the solubility in the refrigerating machine oil is high to thereby reduce the viscosity of the refrigerating machine oil, making lubricating conditions severer. Each of such refrigerant candidates low in GWP is under severe conditions from the viewpoint of lubricity, and thus a refrigerating machine oil to be used is demanded to be high in lubricity.

The refrigerating machine oil according to the present embodiment is sufficiently provided with the above characteristics demanded, and can be used together with various refrigerants.

The refrigerating machine oil according to the present embodiment is preferable as a refrigerating machine oil for refrigerants, containing at least one selected from hydrofluorocarbons (HFCs), hydrofluoroolefins (HFOs), hydrocarbons having 2 to 4 carbon atoms (HC) and carbon dioxide ($CO_2$). In addition, the refrigerating machine oil is preferable for a refrigerant having a global warming potential (GWP) of 1000 or less, and further preferable for a refrigerant having a GWP of 700 or less.

Examples of the HFC refrigerant include hydrofluorocarbons having 1 to 3 carbon atoms, preferably 1 to 2 carbon atoms. Specific examples include trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa) and 1,1,1,3,3-pentafluorobutane (HFC-365mfc), or mixtures of two or more of them. These refrigerants are appropriately selected depending on its application and requirement performances, but preferable examples include HFC-32 itself; HFC-23 itself; HFC-134a itself; HFC-125 itself; a mixture of HFC-134a/HFC-32=60 to 80% by mass/40 to 20% by mass; a mixture of HFC-32/HFC-125=40 to 70% by mass/60 to 30% by mass; a mixture of HFC-125/HFC-143a=40 to 60% by mass/60 to 40% by mass; a mixture of HFC-134a/HFC-32/HFC-125=60% by mass/30% by mass/10% by mass; a mixture of HFC-134a/HFC-32/HFC-125=40 to 70% by mass/15 to 35% by mass/5 to 40% by mass; and a mixture of HFC-125/HFC-134a/HFC-143a=35 to 55% by mass/1 to 15% by mass/40 to 60% by mass. Further specific examples include a mixture of HFC-134a/HFC-32=70/30% by mass; a mixture of HFC-32/HFC-125=60/40% by mass; a mixture of HFC-32/HFC-125=50/50% by mass (R410A); a mixture of HFC-32/HFC-125=45/55% by mass (R410B); a mixture of HFC-125/HFC-143a=50/50% by mass (R507C); a mixture of HFC-32/HFC-125/HFC-134a=30/10/60% by mass; a mixture of HFC-32/HFC-125/HFC-134a=23/25/52% by mass (R407C); a mixture of HFC-32/HFC-125/HFC-134a=25/15/60% by mass (R407E); and a mixture of HFC-125/HFC-134a/HFC-143a=44/4/52% by mass (R404A).

As the unsaturated hydrofluorocarbon (HFO) refrigerant, fluoropropenes having 3 to 5 fluorine atoms are preferable, and any one of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye) and 3,3,3-trifluoropropene (HFO-1243zf), or a mixture of two or more of them is preferable. From the viewpoint of physical properties of the refrigerant, one selected from HFO-1225ye, HFO-1234ze and HFO-1234yf, or two or more selected therefrom is preferable.

Examples of hydrocarbon refrigerants having 2 to 4 carbon atoms include ethylene, ethane, propylene, propane (R290), cyclopropane, n-butane, isobutane, cyclobutane, methylcyclopropane or a mixture of two or more of them. Among them, one that is gaseous at 25° C. and 1 atm is preferably used, and propane, n-butane, isobutane, 2-methylbutane or a mixture thereof is preferable.

EXAMPLES

Hereinafter, the present invention is further specifically described based on Examples and Comparative Examples, but the present invention is not limited to the following Examples at all.

Example 1

Production of Ester (A-1)

Neopentyl glycol, 1,4-butanediol and adipic acid were reacted in neopentyl glycol/1,4-butanediol/adipic acid=1/0.3/2.4 (molar ratio) to obtain an ester intermediate. 3,5,5-Trimethylhexanol was further reacted with this ester intermediate in neopentyl glycol/3,5,5-trimethylhexanol=1/2.5 (molar ratio) using neither a catalyst nor a solvent, and the remaining alcohol was removed by distillation. Then, an adsorption treatment (clay treatment) was performed in the final step to remove traces of impurities, obtaining an ester (kinematic viscosity at 40° C.: 67.8 mm$^2$/s, viscosity index: 145, pour point: −50° C., hereinafter, referred to as ester (A-1)).

Example 2

Production of Ester (A-2)

Neopentyl glycol, 1,3-butanediol and sebacic acid were reacted in neopentyl glycol/1,3-butanediol/sebacic acid=1/0.2/2.4 (molar ratio) to obtain an ester intermediate. n-Octanol was further reacted with this ester intermediate using neither a catalyst nor a solvent so that the ratio of neopentyl glycol/n-octanol was 1/2.6 (molar ratio), and the remaining alcohol was removed by distillation. Then, an adsorption treatment (clay treatment) was performed in the final step to remove traces of impurities, obtaining an ester (kinematic viscosity at 40° C.: 59.0 mm$^2$/s, viscosity index: 158, pour point: −50° C., hereinafter, referred to as "ester (A-2)").

Example 3

Production of Ester (A-3)

Trimethylolpropane, 1,4-butanediol and adipic acid were reacted in trimethylolpropane/1,4-butanediol/adipic acid=1/0.2/2.4 (molar ratio) to obtain an ester intermediate. n-Heptanol was further reacted with this ester intermediate using neither a catalyst nor a solvent so that the ratio of trimethylolpropane/n-heptanol was 1/1.6 (molar ratio), and the remaining alcohol was removed by distillation. Then, an adsorption treatment (clay treatment) was performed in the final step to remove traces of impurities, obtaining an ester (kinematic viscosity at 40° C.: 75.8 mm$^2$/s, viscosity index: 148, hereinafter, referred to as "ester (A-3)").

Example 4

Production of Ester (A-4)

Trimethylolpropane and adipic acid were reacted in trimethylolpropane/adipic acid=1/2.4 (molar ratio) to obtain an ester intermediate. 2-Ethylhexanol was further reacted with this ester intermediate so that the ratio of trimethylolpropane/2-ethylhexanol was 1/1.9 (molar ratio), and the remaining alcohol was removed by distillation. Then, an adsorption treatment (clay treatment) was performed in the final step to remove traces of impurities, obtaining an ester (kinematic viscosity at 40° C.: 68.8 mm$^2$/s, viscosity index: 120, hereinafter, referred to as "ester (A-4)").

Example 5

Production of Ester (A-5)

Neopentyl glycol and adipic acid were reacted in neopentyl glycol/adipic acid=1/0.8 (molar ratio) to obtain an ester intermediate. 3,5,5-Trimethylhexanoic acid was further reacted with this ester intermediate so that the ratio of neopentyl glycol/3,5,5-trimethylhexanoic acid was 1/0.5 (molar ratio), and the remaining fatty acid was removed by distillation. Then, an adsorption treatment (clay treatment) was performed in the final step to remove traces of impurities, obtaining an ester (kinematic viscosity: 71.5 mm$^2$/s, viscosity index: 114, hereinafter, referred to as "ester (A-5)").

Example 6

Production of Ester (A-6)

Neopentyl glycol, 1,4-butanediol and adipic acid were reacted in neopentyl glycol/1,4-butanediol/adipic acid=1/0.1/1.2 (molar ratio) to obtain an ester intermediate. 3,5,5-Trimethylhexanol was further reacted with this ester intermediate in neopentyl glycol/3,5,5-trimethylhexanol=1/0.3 (molar ratio) using neither a catalyst nor a solvent, and the remaining alcohol was removed by distillation. Then, an adsorption treatment (clay treatment) was performed in the final step to remove traces of impurities, obtaining an ester (kinematic viscosity at 40° C.: 275.9 mm²/s, viscosity index: 117, pour point: −35° C., hereinafter, referred to as ester (A-6)).

Example 7

Production of Ester (A-7)

Neopentyl glycol, 1,4-butanediol and adipic acid were reacted in neopentyl glycol/1,4-butanediol/adipic acid=1/0.4/3.1 (molar ratio) to obtain an ester intermediate. 3,5,5-Trimethylhexanol was further reacted with this ester intermediate in neopentyl glycol/3,5,5-trimethylhexanol=1/3.5 (molar ratio) using neither a catalyst nor a solvent, and the remaining alcohol was removed by distillation. Then, an adsorption treatment (clay treatment) was performed in the final step to remove traces of impurities, obtaining an ester (kinematic viscosity at 40° C.: 32.2 mm²/s, viscosity index: 161, pour point: −55° C., hereinafter, referred to as ester (A-7)).

Example 8

Production of Ester (A-8)

Neopentyl glycol and adipic acid were reacted in neopentyl glycol/adipic acid=1/0.8 (molar ratio) to obtain an ester intermediate. 3,5,5-Trimethylhexanoic acid was reacted with this ester intermediate in neopentyl glycol/3,5,5-trimethylhexanoic acid=1/0.3 (molar ratio) using neither a catalyst nor a solvent, and the remaining alcohol was removed by distillation. Then, an adsorption treatment (clay treatment) was performed in the final step to remove traces of impurities, obtaining an ester (kinematic viscosity at 40° C.: 300 mm²/s, viscosity index: 114, pour point: −35° C., hereinafter, referred to as ester (A-8)).

The kinematic viscosity and the viscosity index of each of esters (A-1) to (A-8) were measured or calculated according to JIS K2283. In addition, the pour point was measured according to JIS K 2269-1987.

Examples 9 to 67 and Comparative Examples 1 to 45

Production and Evaluation of Refrigerating Machine Oil

In each of Examples 9 to 67, each of esters (A-1) to (A-8) above was used as the base oil, and 0.1% by mass of di-tert-butyl-p-cresol (DBPC) (based on the total amount of each refrigerating machine oil) as the antioxidant was blended therewith to prepare each refrigerating machine oil.

In Comparative Examples 1 to 45, each of (b-1) to (b-3), (c-1), and (c-2) shown below was used as the base oil, and 0.1% by mass of di-tert-butyl-p-cresol (DBPC) (based on the total amount of each refrigerating machine oil) as the antioxidant was blended therewith to prepare each refrigerating machine oil.

The type of each of the base oils used in Examples 9 to 67 and Comparative Examples 1 to 45 is shown in Tables 1 to 16.

<Base Oils>
(b-1) ester of pentaerythritol with a mixed acid of 2-methylpropanoic acid and 3,5,5-trimethylhexanoic acid in a mass ratio of 1:1 (kinematic viscosity at 40° C.: 69.4 mm²/s, viscosity index: 95, pour point: −45° C.)
(b-2) ester of dipentaerythritol with a mixed acid of n-butanoic acid and 3,5,5-trimethylhexanoic acid in a mass ratio of 7:3 (kinematic viscosity at 40° C.: 68.1 mm²/s, viscosity index: 90)
(b-3) ester of trimethylolpropane with oleic acid (kinematic viscosity at 40° C.: 50.3 mm²/s, viscosity index: 176)
(b-4) ester of pentaerythritol with pentanoic acid and 3,5,5-trimethylhexanoic acid (kinematic viscosity at 40° C.: 31.4 mm²/s, viscosity index: 118, pour point: less than −55° C.)
(c-1) poly-α-olefin (PAO) (kinematic viscosity at 40° C.: 34.0 mm²/s, viscosity index: 170, pour point: less than −55° C.)
(c-2) poly-α-olefin (PAO) (kinematic viscosity at 40° C.: 68.0 mm²/s, viscosity index: 94, pour point: less than −55° C.)

The kinematic viscosity and the viscosity index of each of base oils (b-1) to (b-4), (c-1) and (c-2) were measured and calculated according to JIS K2283. In addition, with respect to each of (b-1) to (b-4) among these base oils, an adsorption treatment (clay treatment) was performed in the final step of production to remove traces of impurities.

Then, each of the refrigerating machine oils in Examples 9 to 67 and Comparative Examples 1 to 45 was used to perform the following tests.

(Lubricity Test)

A high pressure atmosphere friction tester (rotating-sliding system of rotating vane material and fixed disk material), in which a refrigerant atmosphere similar to the actual compressor could be made, manufactured by Shinko Engineering Co., Ltd., was used to perform a lubricity test. The test condition was any of the following lubricity tests-(1) to (4) depending on the type of the refrigerant.

Lubricity test-(1): R32 was used as the refrigerant, and the pressure in the test vessel was 3.1 MPa.
Lubricity test-(2): HFO-1234yf was used as the refrigerant, and the pressure in the test vessel was 1.6 MPa.
Lubricity test-(3): R410A (in a mass ratio of R32/R125=1/1) was used as the refrigerant, and the pressure in the test vessel was 3.1 MPa.
Lubricity test-(4): n-hexane (n-C6) was blended in a volume of 20% to that of the oil for the test (a hydrocarbon refrigerant such as R290 was not sufficient in terms of safety, and was used as an alternative). The pressure was only slightly higher than normal pressure.
Lubricity test-(5): R404A (in a mass ratio of HFC-125/HFC-134a/HFC-143a=44/4/52) was used as the refrigerant, and the pressure in the test vessel was 1.6 MPa.
Lubricity test-(6): R407C (in a mass ratio of HFC-32/HFC-125/HFC-134a=23/25/52) was used as the refrigerant, and the pressure in the test vessel was 1.6 MPa.
Lubricity test-(7): R134a was used as the refrigerant, and the pressure in the test vessel was 1.6 MPa.
Lubricity test-(8): $CO_2$ was used as the refrigerant, and the pressure in the test vessel was 1.6 MPa.

The test conditions other than the above were as follows: the amount of the oil: 600 ml, the test temperature: 110° C., the number of rotation: 500 rpm, the load applied: 80 kgf, and the test time: 1 hour, which were common to those of all lubricity tests-(1) to (8). In addition, SKH-51 was used as the vane material and FC250 was used as the disk material, which were also common to those of all lubricity tests-(1) to (8).

Herein, the evaluation of antiwear property was performed by the wear depth of the vane material because the amount of wear of the disk material was extremely small. The results obtained are shown in Tables 1 to 16.

(Stability Test)

90 g of a refrigerating machine oil whose moisture content was adjusted to 100 ppm was weighed in an autoclave, and catalysts (wires of iron, copper, and aluminum, each diameter: 1.6 mm×50 mm) and 10 g of any of the following refrigerants:

Examples 9 to 16 and Comparative Examples 1 to 6: R32,

Examples 17 to 24 and Comparative Examples 7 to 12: HFO-1234yf,

Examples 25 to 30 and Comparative Examples 13 to 16: R410A,

Examples 31 to 35 and Comparative Examples 17 to 21: n-hexane,

Examples 36 to 43 and Comparative Examples 22 to 27: R404A,

Examples 44 to 51 and Comparative Examples 28 to 33: R407C,

Examples 52 to 59 and Comparative Examples 34 to 39: R134a,

Examples 60 to 67 and Comparative Examples 40 to 45: $CO_2$ were included, and then heated to 175° C., and observation of the appearance and measurement of the acid value of a sample oil after 100 hours were performed. The results obtained are shown in Tables 1 to 16.

Herein, the acid value of each of the sample oils (new oils) before the stability test was 0.01 mgKOH/g.

TABLE 1

|  | Example 9 | Example 10 | Example 11 | Example 12 |
|---|---|---|---|---|
| [Evaluation refrigerant] <Refrigerating machine oil> | R32 | R32 | R32 | R32 |
| Type of base oil | A-1 | A-2 | A-3 | A-4 |
| Lubricity test |  |  |  |  |
| Lubricity condition | (1) | (1) | (1) | (1) |
| Wear depth of vane (μm) | 7.2 | 8.4 | 8.3 | 11.2 |
| Thermal stability test |  |  |  |  |
| Appearance | No precipitate | No precipitate | No precipitate | No precipitate |
| Acid value (mgKOH/g) | 0.01 | 0.01 | 0.01 | 0.01 |

|  | Example 13 | Example 14 | Example 15 | Example 16 |
|---|---|---|---|---|
| [Evaluation refrigerant] <Refrigerating machine oil> | R32 | R32 | R32 | R32 |
| Type of base oil | A-5 | A-6 | A-7 | A-8 |
| Lubricity test |  |  |  |  |
| Lubricity condition | (1) | (1) | (1) | (1) |
| Wear depth of vane (μm) | 8.1 | 6.5 | 8.1 | 6.3 |
| Thermal stability test |  |  |  |  |
| Appearance | No precipitate | No precipitate | No precipitate | No precipitate |
| Acid value (mgKOH/g) | 0.08 | 0.02 | 0.01 | 0.04 |

TABLE 2

|  | Comp. Example 1 | Comp. Example 2 | Comp. Example 3 | Comp. Example 4 | Comp. Example 5 | Comp. Example 6 |
|---|---|---|---|---|---|---|
| [Evaluation refrigerant] <Refrigerating machine oil> | R32 | R32 | R32 | R32 | R32 | R32 |
| Type of base oil | b-1 | b-2 | b-3 | b-4 | c-1 | c-2 |
| Lubricity test |  |  |  |  |  |  |
| Lubricity condition | (1) | (1) | (1) | (1) | (1) | (1) |
| Wear depth of vane (μm) | 14.1 | 16.2 | 16.7 | 16.1 | 18.3 | 12.8 |
| Thermal stability test |  |  |  |  |  |  |
| Appearance | No precipitate | No precipitate | No precipitate | No precipitate | No precipitate | No precipitate |
| Acid value (mgKOH/g) | 0.01 | 0.01 | 0.08 | 0.11 | 0.01 | 0.01 |

TABLE 3

|  | Example 17 | Example 18 | Example 19 | Example 20 |
|---|---|---|---|---|
| [Evaluation refrigerant] <Refrigerating machine oil> | HFO-1234yf | HFO-1234yf | HFO-1234yf | HFO-1234yf |
| Type of base oil | A-1 | A-2 | A-3 | A-4 |

TABLE 3-continued

| Lubricity test | | | | |
|---|---|---|---|---|
| Lubricity condition | (2) | (2) | (2) | (2) |
| Wear depth of vane (μm) | 7.1 | 8.2 | 8.1 | 11.0 |
| Thermal stability test | | | | |
| Appearance | No precipitate | No precipitate | No precipitate | No precipitate |
| Acid value (mgKOH/g) | 0.03 | 0.03 | 0.03 | 0.03 |

| | Example 21 | Example 22 | Example 23 | Example 24 |
|---|---|---|---|---|
| [Evaluation refrigerant] <Refrigerating machine oil> | HFO-1234yf | HFO-1234yf | HFO-1234yf | HFO-1234yf |
| Type of base oil | A-5 | A-6 | A-7 | A-8 |
| Lubricity test | | | | |
| Lubricity condition | (2) | (2) | (2) | (2) |
| Wear depth of vane (μm) | 7.9 | 6.3 | 7.4 | 6.2 |
| Thermal stability test | | | | |
| Appearance | No precipitate | No precipitate | No precipitate | No precipitate |
| Acid value (mgKOH/g) | 0.17 | 0.04 | 0.03 | 0.05 |

TABLE 4

| | Comp. Example 7 | Comp. Example 8 | Comp. Example 9 | Comp. Example 10 | Comp. Example 11 | Comp. Example 12 |
|---|---|---|---|---|---|---|
| [Evaluation refrigerant] <Refrigerating machine oil> | HFO-1234yf | HFO-1234yf | HFO-1234yf | HFO-1234yf | HFO-1234yf | HFO-1234yf |
| Type of base oil | b-1 | b-2 | b-3 | b-4 | c-1 | c-2 |
| Lubricity test | | | | | | |
| Lubricity condition | (2) | (2) | (2) | (2) | (2) | (2) |
| Wear depth of vane (μm) | 13.8 | 15.7 | 16.1 | 15.9 | 15.3 | 13.3 |
| Thermal stability test | | | | | | |
| Appearance | No precipitate | No precipitate | No precipitate | No precipitate | No precipitate | No precipitate |
| Acid value (mgKOH/g) | 0.03 | 0.05 | 0.07 | 0.18 | 0.06 | 0.07 |

TABLE 5

| | Example 25 | Example 26 | Example 27 | Example 28 | Example 29 | Example 30 |
|---|---|---|---|---|---|---|
| [Evaluation refrigerant] <Refrigerating machine oil> | R410A | R410A | R410A | R410A | R410A | R410A |
| Type of base oil | A-1 | A-2 | A-5 | A-6 | A-7 | A-8 |
| Lubricity test | | | | | | |
| Lubricity condition | (3) | (3) | (3) | (3) | (3) | (3) |
| Wear depth of vane (μm) | 7.5 | 8.6 | 8.4 | 6.9 | 7.7 | 6.7 |
| Thermal stability test | | | | | | |
| Appearance | No precipitate | No precipitate | No precipitate | No precipitate | No precipitate | No precipitate |
| Acid value (mgKOH/g) | 0.01 | 0.01 | 0.08 | 0.02 | 0.01 | 0.02 |

TABLE 6

| | Comp. Example 13 | Comp. Example 14 | Comp. Example 15 | Comp. Example 16 |
|---|---|---|---|---|
| [Evaluation refrigerant] <Refrigerating machine oil> | R410A | R410A | R410A | R410A |
| Type of base oil | b-1 | b-4 | c-1 | c-2 |

TABLE 6-continued

|  | Comp. Example 13 | Comp. Example 14 | Comp. Example 15 | Comp. Example 16 |
| --- | --- | --- | --- | --- |
| Lubricity test |  |  |  |  |
| Lubricity condition | (3) | (3) | (3) | (3) |
| Wear depth of vane (μm) | 14.4 | 15.5 | 18.3 | 12.8 |
| Thermal stability test |  |  |  |  |
| Appearance | No precipitate | No precipitate | No precipitate | No precipitate |
| Acid value (mgKOH/g) | 0.01 | 0.11 | 0.01 | 0.01 |

TABLE 7

|  | Example 31 | Example 32 | Example 33 | Example 34 | Example 35 |
| --- | --- | --- | --- | --- | --- |
| [Evaluation refrigerant] | n-C6 | n-C6 | n-C6 | n-C6 | n-C6 |
| <Refrigerating machine oil> |  |  |  |  |  |
| Type of base oil | A-3 | A-4 | A-6 | A-7 | A-8 |
| Lubricity test |  |  |  |  |  |
| Lubricity condition | (4) | (4) | (4) | (4) | (4) |
| Wear depth of vane (μm) | 9.1 | 12.3 | 7.7 | 8.2 | 7.5 |
| Thermal stability test |  |  |  |  |  |
| Appearance | No precipitate | No precipitate | No precipitate | No precipitate | No precipitate |
| Acid value (mgKOH/g) | 0.01 | 0.01 | 0.02 | 0.01 | 0.02 |

TABLE 8

|  | Comp. Example 17 | Comp. Example 18 | Comp. Example 19 | Comp. Example 20 | Comp. Example 21 |
| --- | --- | --- | --- | --- | --- |
| [Evaluation refrigerant] | n-C6 | n-C6 | n-C6 | n-C6 | n-C6 |
| <Refrigerating machine oil> |  |  |  |  |  |
| Type of base oil | b-2 | b-3 | b-4 | c-1 | c-2 |
| Lubricity test |  |  |  |  |  |
| Lubricity condition | (4) | (4) | (4) | (4) | (4) |
| Wear depth of vane (μm) | 18.5 | 17.8 | 19.1 | 22.3 | 19.8 |
| Thermal stability test |  |  |  |  |  |
| Appearance | No precipitate | No precipitate | No precipitate | No precipitate | No precipitate |
| Acid value (mgKOH/g) | 0.01 | 0.03 | 0.08 | 0.01 | 0.01 |

TABLE 9

|  | Example 36 | Example 37 | Example 38 | Example 39 |
| --- | --- | --- | --- | --- |
| [Evaluation refrigerant] | R404A | R404A | R404A | R404A |
| <Refrigerating machine oil> |  |  |  |  |
| Type of base oil | A-1 | A-2 | A-3 | A-4 |
| Lubricity test |  |  |  |  |
| Lubricity condition | (5) | (5) | (5) | (5) |
| Wear depth of vane (μm) | 6.1 | 6.6 | 6.6 | 8.1 |
| Thermal stability test |  |  |  |  |
| Appearance | No precipitate | No precipitate | No precipitate | No precipitate |
| Acid value (mgKOH/g) | 0.01 | 0.01 | 0.01 | 0.01 |
|  | Example 40 | Example 41 | Example 42 | Example 43 |
| [Evaluation refrigerant] | R404A | R404A | R404A | R404A |
| <Refrigerating machine oil> |  |  |  |  |
| Type of base oil | A-5 | A-6 | A-7 | A-8 |

TABLE 9-continued

| Lubricity test | | | | |
|---|---|---|---|---|
| Lubricity condition | (5) | (5) | (5) | (5) |
| Wear depth of vane (μm) | 6.5 | 5.7 | 6.2 | 5.8 |
| Thermal stability test | | | | |
| Appearance | No precipitate | No precipitate | No precipitate | No precipitate |
| Acid value (mgKOH/g) | 0.06 | 0.01 | 0.01 | 0.01 |

TABLE 10

| | Comp. Example 22 | Comp. Example 23 | Comp. Example 24 | Comp. Example 25 | Comp. Example 26 | Comp. Example 27 |
|---|---|---|---|---|---|---|
| [Evaluation refrigerant] <Refrigerating machine oil> | R404A | R404A | R404A | R404A | R404A | R404A |
| Type of base oil | b-1 | b-2 | b-3 | b-4 | c-1 | c-2 |
| Lubricity test | | | | | | |
| Lubricity condition | (5) | (5) | (5) | (5) | (5) | (5) |
| Wear depth of vane (μm) | 9.5 | 10.5 | 10.7 | 11.3 | 10.3 | 9.9 |
| Thermal stability test | | | | | | |
| Appearance | No precipitate | No precipitate | No precipitate | No precipitate | No precipitate | No precipitate |
| Acid value (mgKOH/g) | 0.01 | 0.01 | 0.03 | 0.10 | 0.01 | 0.01 |

TABLE 11

| | Example 44 | Example 45 | Example 46 | Example 47 |
|---|---|---|---|---|
| [Evaluation refrigerant] <Refrigerating machine oil> | R407C | R407C | R407C | R407G |
| Type of base oil | A-1 | A-2 | A-3 | A-4 |
| Lubricity test | | | | |
| Lubricity condition | (6) | (6) | (6) | (6) |
| Wear depth of vane (μm) | 5.7 | 6.0 | 6.0 | 6.9 |
| Thermal stability test | | | | |
| Appearance | No precipitate | No precipitate | No precipitate | No precipitate |
| Acid value (mgKOH/g) | 0.01 | 0.01 | 0.01 | 0.01 |
| | Example 48 | Example 49 | Example 50 | Example 51 |
| [Evaluation refrigerant] <Refrigerating machine oil> | R407C | R407C | R407C | R407C |
| Type of base oil | A-5 | A-6 | A-7 | A-8 |
| Lubricity test | | | | |
| Lubricity condition | (6) | (6) | (6) | (6) |
| Wear depth of vane (μm) | 5.9 | 5.4 | 5.8 | 5.3 |
| Thermal stability test | | | | |
| Appearance | No precipitate | No precipitate | No precipitate | No precipitate |
| Acid value (mgKOH/g) | 0.07 | 0.01 | 0.01 | 0.02 |

TABLE 12

| | Comp. Example 28 | Comp. Example 29 | Comp. Example 30 | Comp. Example 31 | Comp. Example 32 | Comp. Example 33 |
|---|---|---|---|---|---|---|
| [Evaluation refrigerant] <Refrigerating machine oil> | R407C | R407C | R407C | R407C | R407C | R407C |
| Type of base oil | b-1 | b-2 | b-3 | b-4 | c-1 | c-2 |
| Lubricity test | | | | | | |
| Lubricity condition | (6) | (6) | (6) | (6) | (6) | (6) |
| Wear depth of vane (μm) | 7.8 | 8.3 | 8.5 | 9.3 | 8.9 | 8.8 |

TABLE 12-continued

|  | Comp. Example 28 | Comp. Example 29 | Comp. Example 30 | Comp. Example 31 | Comp. Example 32 | Comp. Example 33 |
|---|---|---|---|---|---|---|
| Thermal stability test |  |  |  |  |  |  |
| Appearance | No precipitate | No precipitate | No precipitate | No precipitate | No precipitate | No precipitate |
| Acid value (mgKOH/g) | 0.01 | 0.01 | 0.01 | 0.011 | 0.01 | 0.01 |

TABLE 13

|  | Example 52 | Example 53 | Example 54 | Example 55 |
|---|---|---|---|---|
| [Evaluation refrigerant] <Refrigerating machine oil> | R134a | R134a | R134a | R134a |
| Type of base oil | A-1 | A-2 | A-3 | A-4 |
| Lubricity test |  |  |  |  |
| Lubricity condition | (7) | (7) | (7) | (7) |
| Wear depth of vane (μm) | 6.4 | 7.2 | 7.1 | 9.1 |
| Thermal stability test |  |  |  |  |
| Appearance | No precipitate | No precipitate | No precipitate | No precipitate |
| Acid value (mgKOH/g) | 0.01 | 0.01 | 0.01 | 0.01 |

|  | Example 56 | Example 57 | Example 58 | Example 59 |
|---|---|---|---|---|
| [Evaluation refrigerant] <Refrigerating machine oil> | R134a | R134a | R134a | R134a |
| Type of base oil | A-5 | A-6 | A-7 | A-8 |
| Lubricity test |  |  |  |  |
| Lubricity condition | (7) | (7) | (7) | (7) |
| Wear depth of vane (μm) | 7.0 | 5.9 | 6.6 | 5.8 |
| Thermal stability test |  |  |  |  |
| Appearance | No precipitate | No precipitate | No precipitate | No precipitate |
| Acid value (mgKOH/g) | 0.07 | 0.01 | 0.01 | 0.01 |

TABLE 14

|  | Comp. Example 34 | Comp. Example 35 | Comp. Example 36 | Comp. Example 37 | Comp. Example 38 | Comp. Example 39 |
|---|---|---|---|---|---|---|
| [Evaluation refrigerant] <Refrigerating machine oil> | R134a | R134a | R134a | R134a | R134a | R134a |
| Type of base oil | b-1 | b-2 | b-3 | b-4 | c-1 | c-2 |
| Lubricity test |  |  |  |  |  |  |
| Lubricity condition | (7) | (7) | (7) | (7) | (7) | (7) |
| Wear depth of vane (μm) | 10.9 | 12.2 | 12.5 | 10.3 | 13.4 | 11.1 |
| Thermal stability test |  |  |  |  |  |  |
| Appearance | No precipitate | No precipitate | No precipitate | No precipitate | No precipitate | No precipitate |
| Acid value (mgKOH/g) | 0.01 | 0.01 | 0.02 | 0.11 | 0.01 | 0.01 |

TABLE 15

|  | Example 60 | Example 61 | Example 62 | Example 63 |
|---|---|---|---|---|
| [Evaluation refrigerant] <Refrigerating machine oil> | $CO_2$ | $CO_2$ | $CO_2$ | $CO_2$ |
| Type of base oil | A-1 | A-2 | A-3 | A-4 |
| Lubricity test |  |  |  |  |
| Lubricity condition | (8) | (8) | (8) | (8) |
| Wear depth of vane (μm) | 6.0 | 6.5 | 6.4 | 7.7 |

TABLE 15-continued

| Thermal stability test | | | | |
|---|---|---|---|---|
| Appearance | No precipitate | No precipitate | No precipitate | No precipitate |
| Acid value (mgKOH/g) | 0.01 | 0.01 | 0.01 | 0.01 |
| | Example 64 | Example 65 | Example 66 | Example 67 |
| [Evaluation refrigerant] <Refrigerating machine oil> | $CO_2$ | $CO_2$ | $CO_2$ | $CO_2$ |
| Type of base oil | A-5 | A-6 | A-7 | A-8 |
| Lubricity test | | | | |
| Lubricity condition | (8) | (8) | (8) | (8) |
| Wear depth of vane (μm) | 6.3 | 5.6 | 6.1 | 5.3 |
| Thermal stability test | | | | |
| Appearance | No precipitate | No precipitate | No precipitate | No precipitate |
| Acid value (mgKOH/g) | 0.09 | 0.01 | 0.01 | 0.01 |

TABLE 16

| | Comp. Example 40 | Comp. Example 41 | Comp. Example 42 | Comp. Example 43 | Comp. Example 44 | Comp. Example 45 |
|---|---|---|---|---|---|---|
| [Evaluation refrigerant] <Refrigerating machine oil> | $CO_2$ | $CO_2$ | $CO_2$ | $CO_2$ | $CO_2$ | $CO_2$ |
| Type of base oil | b-1 | b-2 | b-3 | b-4 | c-1 | c-2 |
| Lubricity test | | | | | | |
| Lubricity condition | (8) | (8) | (8) | (8) | (8) | (8) |
| Wear depth of vane (μm) | 9.0 | 9.9 | 10.0 | 11.1 | 9.9 | 10.3 |
| Thermal stability test | | | | | | |
| Appearance | No precipitate | No precipitate | No precipitate | No precipitate | No precipitate | No precipitate |
| Acid value (mgKOH/g) | 0.02 | 0.03 | 0.05 | 0.11 | 0.01 | 0.01 |

The evaluation results were shown in Tables 1, 2 when R32 was used, the evaluation results were shown in Tables 3, 4 when HFO-1234yf was used, the evaluation results were shown in Tables 5, 6 when R410A was used, the evaluation results were shown in Tables 7, 8 when n-hexane was used, the evaluation results were shown in Tables 9, 10 when R404A was used, the evaluation results were shown in Tables 11, 12 when R407C was used, the evaluation results were shown in Tables 13, 14 when R134a was used, and the evaluation results were shown in Tables 15, 16 when $CO_2$ was used, respectively.

It can be seen that the refrigerating machine oil of each of Examples 9 to 59 was favorable in antiwear property and also good in stability.

INDUSTRIAL APPLICABILITY

The lubricating base oil and the refrigerating machine oil of the present invention are each a refrigerating machine oil that is excellent in antiwear property and stability even under severe lubricating conditions, and thus can be suitably used in a high-cooling efficiency refrigeration system having a compressor, a condenser, a throttle device, an evaporator, and the like among which the refrigerant is circulated, in particular, in a system having a compressor such as a rotary-type, swing-type, or scrolling-type, and can be used in the fields of a room air-conditioner, an all-in-one air conditioner, a coolerator, a car air-conditioner, an industrial refrigerator, and the like.

The invention claimed is:

1. A working fluid composition for a refrigerating machine oil, comprising:
    a refrigerating machine oil comprising a base oil comprising an ester synthesized from:
       a first component that is at least one selected from polyhydric alcohols having 2 to 4 hydroxyl groups;
       a second component that is at least one selected from polybasic acids having 6 to 12 carbon atoms; and
       a third component that is at least one selected from monohydric alcohols having 4 to 18 carbon atoms and monocarboxylic acids having 2 to 12 carbon atoms,
    wherein the first component comprises
       a first alcohol that is at least one selected from neopentyl glycol, trimethylolpropane and pentaerythritol; and
       a second alcohol that is a butanediol, and
    a refrigerant comprising at least one selected from hydrofluorocarbons, hydrofluoroolefins, hydrocarbons having 2 to 4 carbon atoms, and carbon dioxide.

2. The working fluid composition according to claim 1, wherein the first component comprises at least one selected from neopentyl glycol and trimethylolpropane.

3. The working fluid composition according to claim 1, wherein the second component comprises at least one selected from adipic acid and sebacic acid.

4. The working fluid composition according to claim 1, wherein the third component comprises at least one selected from monohydric alcohols having 8 to 10 carbon atoms.

5. The working fluid composition according to claim 1, wherein the refrigerant has a global warming potential of 1000 or less.

6. The working fluid composition according to claim 1, wherein the refrigerant has a global warming potential of 700 or less.

7. The working fluid composition according to claim 1, wherein the refrigerant comprises difluoromethane.

8. The working fluid composition according to claim 1, wherein the refrigerant comprises propane or isobutane.

9. The working fluid composition according to claim 1, wherein the refrigerant comprises at least one hydrofluoropropene.

* * * * *